US008939686B2

(12) United States Patent
Masuo

(10) Patent No.: US 8,939,686 B2
(45) Date of Patent: Jan. 27, 2015

(54) GEAR MACHINING METHOD

(75) Inventor: Koichi Masuo, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 282 days.

(21) Appl. No.: 13/581,207

(22) PCT Filed: Apr. 16, 2010

(86) PCT No.: PCT/JP2010/056804
§ 371 (c)(1),
(2), (4) Date: Nov. 13, 2012

(87) PCT Pub. No.: WO2011/129008
PCT Pub. Date: Oct. 20, 2011

(65) Prior Publication Data
US 2013/0051948 A1  Feb. 28, 2013

(51) Int. Cl.
*B23F 1/06* (2006.01)
*B23F 23/00* (2006.01)
(Continued)

(52) U.S. Cl.
CPC ............. *B23F 23/006* (2013.01); *B23F 5/04* (2013.01); *B23F 5/22* (2013.01)
USPC .............................. 409/12; 409/20

(58) Field of Classification Search
CPC .............. B23F 1/06; B23F 5/24; B23F 9/082; B23F 15/02; B23P 15/14; B23Q 17/2233; B23Q 17/225
USPC ............. 409/11, 12, 15, 20, 24, 34, 51, 61, 2; 451/47, 5–10, 251, 253; 700/160, 175, 700/192, 193; 29/893.3, 893.35, 407.05, 29/407.09, 406
See application file for complete search history.

(56) References Cited

U.S. PATENT DOCUMENTS 3,318,194 A * 5/1967 Bean .............................. 409/34
4,954,027 A    9/1990 Faulstich
(Continued)

FOREIGN PATENT DOCUMENTS

JP    2-9528 A     1/1990
JP    11-291125 A  10/1999
(Continued)

OTHER PUBLICATIONS

International Search Report and Written Opinion mailed Jul. 13, 2010 with English Translation.
(Continued)

*Primary Examiner* — Daniel Howell
*Assistant Examiner* — Nicole N Ramos
(74) *Attorney, Agent, or Firm* — Birch, Stewart, Kolasch & Birch, LLP

(57) ABSTRACT

Provided is a gear machining method whereby a gear to be machined that is eccentrically mounted can be machined with high accuracy. For this purpose, the gear machining method is such that a target table rotation phase (Co) for a rotation table (16) and a target cut amount (Xo) for a hob cutter (15) are set on the basis of data regarding a workpiece (W), that a table rotation phase correction amount ($\Delta C$) is obtained on the basis of an eccentric amount ($\delta$) of the workpiece (W) with respect to the rotation table (16) and an eccentric rotation phase ($\phi$) of the workpiece (W) with respect to the same, that the rotation table (16) is rotated in an actual rotation phase (Ct) which is obtained by applying a rotation phase correction amount ($\Delta C$) to the target table rotation phase (Co), that furthermore, a cutting correction amount ($\Delta X$) is obtained on the basis of the workpiece eccentric amount ($\delta$), the workpiece eccentric rotation phase ($\phi$), and the actual table rotation phase (Ct), and that the hob cutter (15) is made to cut into the workpiece (W) by an actual cut amount (Xh) which is obtained by applying the cutting correction amount ($\Delta X$) to the target cut amount (Xo).

1 Claim, 3 Drawing Sheets

(51) Int. Cl.
  *B23F 5/04*   (2006.01)
  *B23F 5/22*   (2006.01)

(56) References Cited

U.S. PATENT DOCUMENTS

| | | | | |
|---|---|---|---|---|
| 5,257,882 A | * | 11/1993 | Stadtfeld et al. | 409/26 |
| 6,729,936 B1 | * | 5/2004 | Hori et al. | 451/8 |
| 7,402,007 B2 | * | 7/2008 | Fahrer et al. | 409/26 |
| 7,530,878 B2 | * | 5/2009 | Simakov et al. | 451/5 |
| 2010/0041314 A1 | | 2/2010 | Kurashiki et al. | |

FOREIGN PATENT DOCUMENTS

| | | |
|---|---|---|
| JP | 2001-347423 A | 12/2001 |
| JP | 2003-191131 A | 7/2003 |
| TW | I227685 B | 2/2005 |
| TW | 200902199 A | 1/2009 |
| WO | WO 2009/114203 A1 | 9/2009 |

OTHER PUBLICATIONS

Japanese Office Action dated Feb. 4, 2014 for corresponding Japanese Application No. 2012-510519.

* cited by examiner

GEAR MACHINING METHOD

TECHNICAL FIELD

The present invention relates to a gear machining method of performing gear machining on a work gear by engaging a rotary tool and the work gear with each other and rotating the rotary tool and the work gear in synchronization with each other.

BACKGROUND ART

Gear machine tools have conventionally been provided as machines for gear machining of a workpiece, or a work gear, with a rotary tool. Among such gear machine tools, there are ones, such as hobbing machines and gear grinding machines, configured to perform generating machining on a workpiece with a rotary tool such as a hob cutter or a threaded grinding wheel. To perform such gear machining, the rotary tool and the workpiece are rotated about their respective axes, and from this state, the rotary tool is caused to cut into the workpiece. As a result, portions of the outer circumference of the workpiece are ground by a cutting part of the rotary tool, so that a tooth profile is created in the workpiece.

Here, the rotation of the workpiece about its axis is done by rotating a rotary table, on which the workpiece is mounted, about its axis. In other words, the workpiece must be mounted on the rotary table coaxially with the rotary table.

In general, a mount jig is mounted on the rotary table, and the workpiece is mounted on the rotary table through this mount jig. It is, however, difficult to mount the workpiece accurately coaxially with the rotary table due to factors such as machining errors and assembling errors in these components. Such centering of the workpiece is even more difficult particularly in a case of a large-sized workpiece measuring several meters in diameter and weighing several tons.

When the workpiece is mounted eccentrically on the rotary table, there occur not only an error in the cutting depth (in the radial direction) but also an error in the cumulative pitch (in the circumferential direction) of the gear. Correcting only the cutting depth is easy, but correcting the cumulative pitch in addition to the cutting depth is not easy because it complicates calculation formulae.

In this respect, gear machining methods have conventionally been provided which allow gear machining of a workpiece mounted eccentrically. Such a gear machining method is disclosed in Patent Document 1, for example.

PRIOR ART DOCUMENT

Patent Document

Patent Document 1: Japanese Patent Application Publication No. 2003-191131

SUMMARY OF THE INVENTION

Problem to be Solved by the Invention

In the conventional gear machining method mentioned above, a table rotation phase correction amount for a rotary table is calculated from the amount of the eccentricity of a workpiece from the rotary table and the difference in the rotation phase of the workpiece from that of the rotary table, and then this table rotation phase correction amount is used to calculate a cutting depth correction amount for a hob cutter. Thereafter, the rotary table is rotated with the table rotation phase correction amount added to a previously set target table rotation phase, while the rotary tool is caused to cut into the workpiece with the cutting depth correction amount added to a previously set target cutting depth. In this way, gear machining can be performed even when the workpiece is mounted eccentrically.

In the conventional gear machining method, however, the center of the calculated table rotation phase correction amount does not necessarily coincide with the axial center of the rotary table and may be set in some cases at a position offset from the rotation axis of the rotary table. Further, in the calculation of the cutting depth correction amount, the target table rotation phase before the correction is used despite that the rotary tool cannot cut the workpiece accurately without using an actual table rotation phase after the correction in which the table rotation phase correction amount is added. For this reason, in the conventional gear machining method, it is difficult to accurately machine the workpiece mounted eccentrically.

Accordingly, the present invention has been made to solve the above-described problem, and an object thereof is to provide a gear machining method which allows highly accurate gear machining of a work gear mounted eccentrically.

Means for Solving the Problems

A gear machining method of the present invention for solving the above problem is a gear machining method of performing gear machining on a work gear by engaging a rotary tool and the work gear with each other and rotating the rotary tool and the work gear in synchronization with each other, characterized in that the method comprises:

setting, based on a specification of the work gear, a target table rotation phase of a rotary table configured to rotate the work gear, and a target cutting depth of the rotary tool in the work gear which corresponds to the target table rotation phase;

finding a table rotation phase correction amount for the rotary table on the basis of an amount of eccentricity and a difference in rotation phase of the work gear from the rotary table, and rotating the rotary table in an actual table rotation phase obtained by adding the table rotation phase correction amount to the target table rotation phase; and finding a cutting depth correction amount for the rotary tool on the basis of the amount of eccentricity, the difference in rotation phase, and the actual table rotation phase, and causing the rotary tool to cut into the work gear to an actual cutting depth obtained by adding the cutting depth correction amount to the target cutting depth.

Effect of the Invention

According to the gear machining method according to the present invention, it is possible to perform highly accurate gear machining on a work gear even when the work gear is mounted eccentrically to a rotary table.

MODE FOR CARRYING OUT THE INVENTION

Hereinbelow, a gear machining method according to the present invention will be described in detail by using the drawings.

Embodiment

Figure 1:
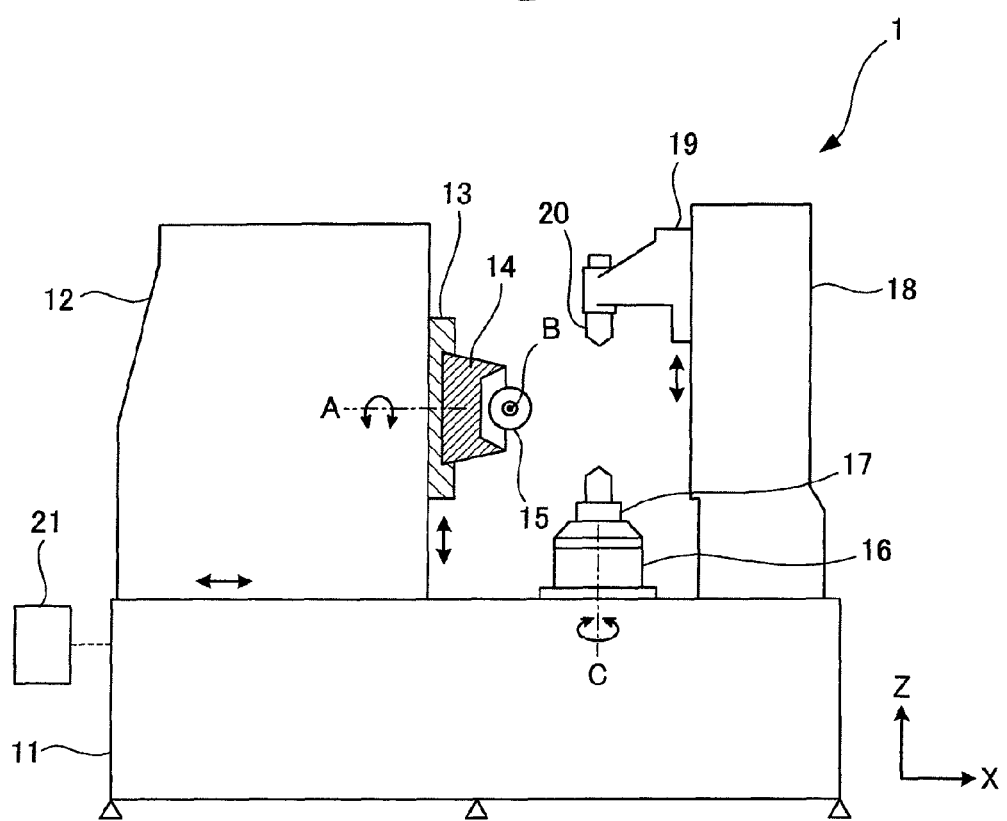
FIG. 1 is a side view of a hobbing machine to which a gear machining method according to an embodiment of the present invention is applied.

As shown in FIG. 1, a column 12 is supported on a bed 11 of a hobbing machine 1 movably in a horizontal X-axis direction. A hob saddle 13 is supported on the front surface of the column 12 in such a manner as to be elevated in a vertical Z-axis direction. A hob head 14 is supported on this hob saddle 13 turnably about a horizontal axis A and movably in a horizontal Y-axis direction. A hob cutter (rotary tool) 15 is mounted in a detachably attachable manner to the hob head 14. This hob cutter 15 can be rotated about a horizontal axis B when mounted to the hob head 14.

Figure 2:
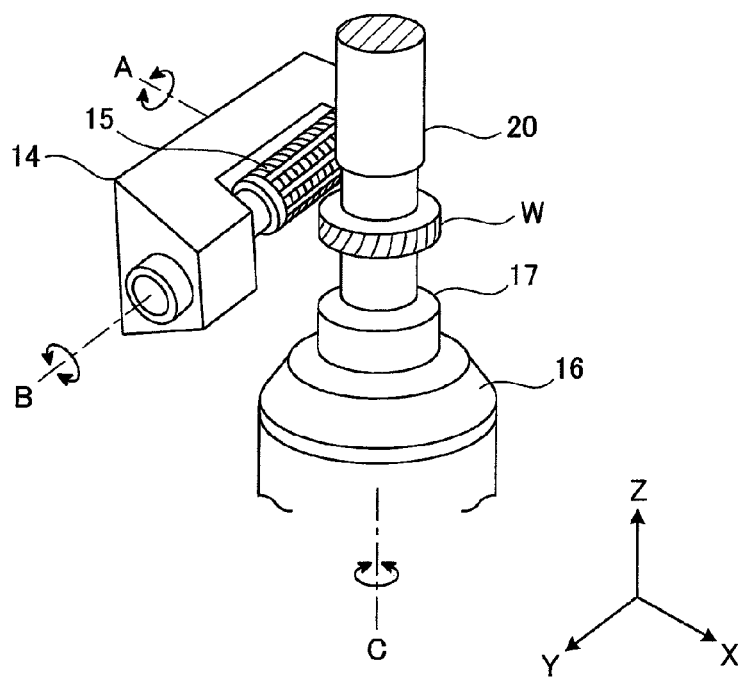
FIG. 2 is an enlarged view of a main part in FIG. 1.

Moreover, as shown in FIGS. 1 and 2, a rotary table 16 is supported on the bed 11 in front of the column 12 rotatably about a vertical C axis. A mount jig 17 is mounted in a detachably attachable manner to the upper surface of the rotary table 16. A workpiece (work gear) W, serving as a gear material, is mounted in a detachably attachable manner on this mount jig 17. Note that the workpiece W is not mounted on the mount jig 17 in FIG. 1.

Further, a support column 18 is provided standing on the bed 11 on the opposite side of the rotary table 16 from the column 12. An elevating head 19 is supported on the front surface of the support column 18 in such a manner as to be elevated in the Z-axis direction. A support center 20 is provided at the tip of this elevating head 19. Note that the support center 20 is disposed with its axis coinciding with the axis C. Specifically, with the support center 20 being lowered through the elevating head 19, the workpiece W is supported rotatably between the mount jig 17 and the support center 20. By rotating the rotary table 16 in this state, the workpiece W is rotated about the axis C.

Moreover, the hobbing machine 1 includes an NC device 21 which performs centralized control on the entire hobbing machine 1. This NC device 21 is connected to the column 12, the hob saddle 13, the hob head 14, the rotary table 16, the elevating head 19, and the like, for example, and is configured to control the movement of the hob cutter 15 in the X-, Y-, and Z-axis directions, the turn of the hob cutter 15 about the axis A, and the rotation of the hob cutter 15 about the axis B, as well as the rotation of the workpiece W about the axis C on the basis of an inputted machining condition and the specifications of on the workpiece (gear).

Accordingly, when the workpiece W undergoes gear machining with the hobbing machine 1, the workpiece W is first mounted on the mount jig 17, and the support center 20 is then lowered to rotatably support the workpiece W between the mount jig 17 and the support center 20. Thereafter, the column 12, the hob saddle 13, and the hob head 14 are driven to make the hob cutter 15 move in the X-, Y-, and Z-axis directions and also turn about the axis A in accordance with the helix angle of the workpiece W, to thereby engage with the workpiece W. Subsequently, the hob cutter 15 is rotated about the axis B while the rotary table 16 is rotated about the axis C. Then, from this state, the column 12 is moved in the X-axis direction to cause the hob cutter 15 to cut into the workpiece W. As a result, a cutting part of the hob cutter 15 grinds and removes portions of the outer circumference of the workpiece W and thereby generates a tooth profile in the workpiece W.

Meanwhile, in gear machine tools such as bobbing machines, it is difficult to mount the workpiece accurately coaxially with the rotary table in a case of machining a large-sized workpiece. This makes the workpiece eccentric to the rotary table and may possibly cause a decrease in gear machining accuracy such as a cutting depth error or a cumulative pitch error of the gear.

To this end, the NC device 21 of the hobbing machine 1 corrects the rotation phase of the rotary table 16 (later-described target table rotation phase Co) and the cutting depth of the hob cutter 15 (later-described target cutting depth Xo being the moving amount of the column 12 in the X-axis direction) so that the amount of the eccentricity of the workpiece W from the rotary table 16 may be cancelled out even when the centering of the workpiece as mentioned earlier cannot be done sufficiently.

Figure 3:
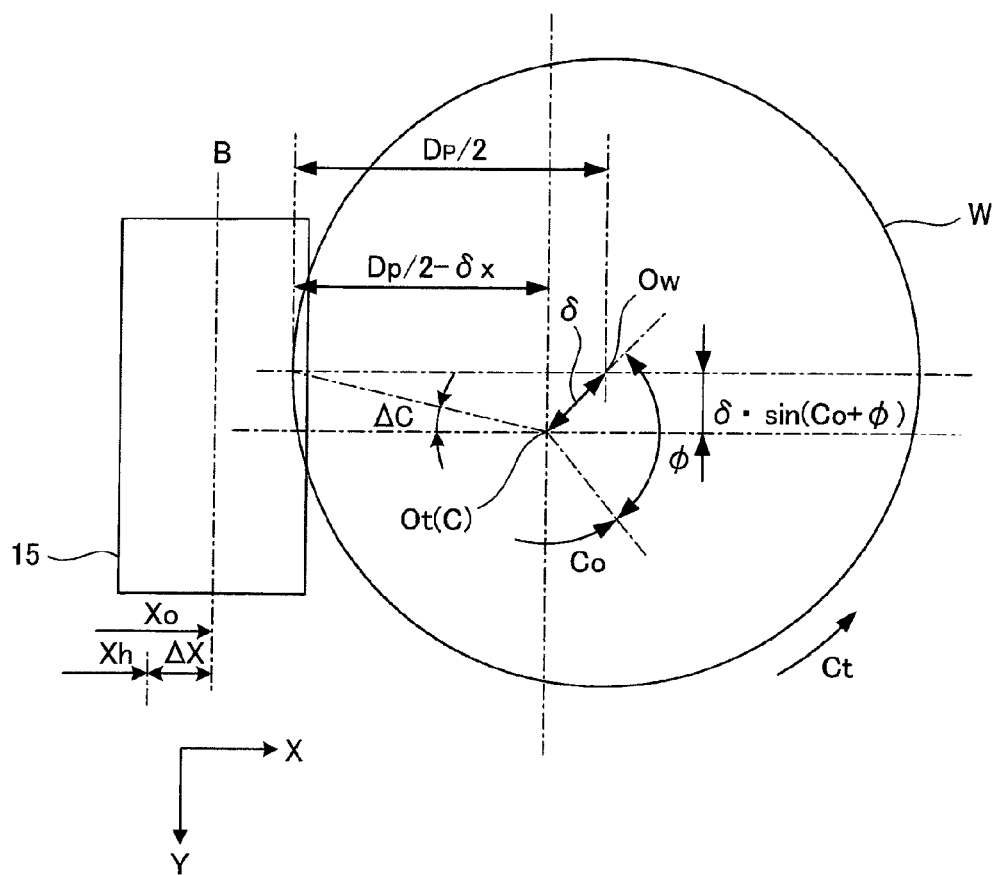
FIG. 3 is a schematic plan view showing how an eccentrically mounted workpiece undergoes gear machining.

Next, a process of correcting the eccentricity of the workpiece with the NC device 21 will be described in detail by using FIG. 3.

First, before causing the hob cutter 15 to cut into the workpiece W, the distance between a center Ot of the rotary table 16 and a center Ow of the workpiece W (hereinafter, referred to as workpiece eccentricity amount δ), and the difference in the rotation phase of the workpiece W from that of the rotary table 16 (hereinafter, workpiece eccentric rotation phase φ) are measured, and the workpiece eccentricity amount δ and the workpiece eccentric rotation phase φ are inputted to the NC device 21. Moreover, in the NC device 21, the number of rotations of the hob cutter 15 and that of the rotary table 16 as well as the cutting depth of the hob cutter 15 (hereinafter, referred to as target cutting depth Xo) when the rotary table reaches a predetermined rotation phase (hereinafter, referred to as target table rotation phase Co) are set based on previously inputted workpiece specifications for machining the workpiece W into a predetermined tooth profile.

Then, the NC device 21 uses the workpiece eccentricity amount δ and the workpiece eccentric rotation phase φ to calculate a correction amount to be added to the target table rotation phase Co, specifically, to calculate a table rotation phase correction amount ΔC. This table rotation phase correction amount ΔC is calculated from a formula (1) described below.

$$\Delta C = \delta \cdot \sin(Co+\phi)/(Dp/2-\delta x) \quad (1)$$

where Dp is the pitch circle diameter of the workpiece which is one element of the workpiece specifications, and δx represents a component of the workpiece eccentricity amount δ in the X-axis direction and is equal to $\delta \cdot \cos(Co+\phi)$.

Thereafter, the calculated table rotation phase correction amount ΔC is added to the target table rotation phase Co to calculate an actual table rotation phase Ct which is the actual rotation phase of the rotary table 16. This actual table rotation phase Ct is calculated from a formula (2) described below.

$$Ct = Co + \Delta C \quad (2)$$

Further, the NC device 21 uses the actual table rotation phase Ct calculated as described above to calculate a correction amount to be added to the target cutting depth Xo, specifically, to calculate a cutting depth correction amount ΔX. This cutting depth correction amount ΔX is calculated from a formula (3) described below.

$$\Delta X = \delta \cdot \cos(Ct+\phi) \quad (3)$$

Thereafter, the calculated cutting depth correction amount ΔX is added to the target cutting depth Xo to calculate an actual cutting depth Xh which is the actual cutting depth of the hob cutter 15. This actual cutting depth Xh is calculated from a formula (4) described below.

$$Xh = Xo + \Delta X \quad (4)$$

Thus, the outer circumference of the workpiece W remains in contact with an axially center portion of the hob cutter 15 by adding the table rotation phase correction amount ΔC about the center Ot (axis C) of the rotary table 16 to the target table rotation phase Co of the rotary table 16, and by adding the cutting depth correction amount ΔX found based on the actual table rotation phase Ct after the correction to the target cutting depth Xo of the hob cutter 15. As a result, a tooth profile is generated in the outer circumference of the workpiece W in such a way that the workpiece eccentricity amount δ thereof is visually cancelled out. Accordingly, highly accurate gear machining can be performed on the workpiece W even when the workpiece W is mounted eccentrically on the rotary table 16.

Note that while the gear machining method according to the present invention is applied in this embodiment as a hobbing method of hobbing a workpiece with a hob cutter of a hobbing machine, the gear machining method can be applied as a shaping method of shaping a workpiece with a cutter of a gear shaping machine, or as a grinding method of grinding a workpiece with a threaded grinding wheel of a gear grinding machine.

INDUSTRIAL APPLICABILITY

The present invention is applicable as a gear machining method which can prevent breakage of a rotary tool or a workpiece which is attributable to eccentric mounting of the workpiece.

The invention claimed is:

1. A gear machining method of performing gear machining on a work gear by engaging a rotary tool and the work gear with each other and rotating the rotary tool and the work gear in synchronization with each other, characterized in that the method comprises:

setting, based on a specification of the work gear, a target table rotation phase of a rotary table configured to rotate the work gear, and a target cutting depth of the rotary tool in the work gear which corresponds to the target table rotation phase;

finding a table rotation phase correction amount for the rotary table on the basis of an amount of eccentricity and a difference in rotation phase of the work gear from the rotary table, and rotating the rotary table in an actual table rotation phase obtained by adding the table rotation phase correction amount to the target table rotation phase; and finding a cutting depth correction amount for the rotary tool on the basis of the amount of eccentricity, the difference in rotation phase, and the actual table rotation phase, and causing the rotary tool to cut into the work gear to an actual cutting depth obtained by adding the cutting depth correction amount to the target cutting depth.

* * * * *